US008319356B2

(12) United States Patent
Fonseca

(10) Patent No.: US 8,319,356 B2
(45) Date of Patent: Nov. 27, 2012

(54) SYSTEM FOR STARTING POWER SYSTEMS WITH MULTIPLE GENERATOR UNITS

(75) Inventor: Roy C Fonseca, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1038 days.

(21) Appl. No.: 12/198,231

(22) Filed: Aug. 26, 2008

(65) Prior Publication Data

US 2010/0052331 A1 Mar. 4, 2010

(51) Int. Cl.
*F02B 63/04* (2006.01)
*H02K 7/18* (2006.01)

(52) U.S. Cl. ...................... 290/1 A; 74/661; 123/179.19

(58) Field of Classification Search .................. 290/1 A; 74/661; 123/179.19
See application file for complete search history.

(56) References Cited

U.S. PATENT DOCUMENTS 2,742,759 A 4/1956 Flanigen et al. ................ 60/790
3,157,993 A 11/1964 Duttman ......................... 60/788
3,182,650 A 5/1965 Heckt ...................... 123/179.31
3,645,351 A * 2/1972 Muller ......................... 180/69.6
3,804,191 A * 4/1974 Golan et al. .................. 180/248
3,939,652 A * 2/1976 Hubers ........................ 60/39.63
3,967,132 A 6/1976 Takamine ..................... 290/4 R
3,985,110 A * 10/1976 Doundoulakis ............... 123/215
4,090,415 A * 5/1978 Gorrell et al. ................ 180/69.6
4,235,216 A 11/1980 Miles ....................... 123/179.19
4,292,804 A 10/1981 Rogers, Sr. ..................... 60/407
4,324,212 A 4/1982 Samuel et al. ........... 123/179.31
4,392,393 A * 7/1983 Montgomery .................. 74/661
4,543,923 A 10/1985 Hamano et al. .......... 123/179.31
4,589,385 A 5/1986 Kettler ..................... 123/179.31
4,679,533 A 7/1987 Klie et al. ................ 123/179.31
4,747,270 A * 5/1988 Klie et al. ....................... 60/627
5,267,539 A * 12/1993 Becker et al. ............ 123/179.31
5,435,125 A 7/1995 Telakowski ..................... 60/788
5,549,174 A * 8/1996 Reis ............................. 180/165
6,006,519 A 12/1999 Hormell, Jr. ..................... 60/407
6,460,500 B1 10/2002 Ooyama et al. ............ 123/179.3
7,203,593 B2 4/2007 Lepley et al. ................. 701/113
7,471,001 B2 * 12/2008 Remele et al. ................ 290/1 A
2007/0157894 A1 7/2007 Scuderi et al. .............. 123/70 R
2008/0067817 A1 * 3/2008 Remele et al. .............. 290/40 R
2011/0017164 A1 * 1/2011 Larson ....................... 123/179.3

* cited by examiner

*Primary Examiner* — Pedro J Cuevas

(57) ABSTRACT

A control system and strategy for starting power systems having a plurality of power modules. For example, a multi-engine generator set switcher locomotive has three power modules each of which have an engine associated therewith. Upon receiving a command from the locomotive indicating to the engine control module to start at least one power module, i.e., engine, the control strategy determines whether to start the engine with an air or electric start. The control strategy starts only a single engine at a time, thereby avoiding over-loading the airflow capacity of the compressed air source or the electric power capacity of the electric source. The control strategy also implements a command to start every engine with an air starter, if possible, to preserve the electric starter motor and the electric power capacity of the electric source.

14 Claims, 6 Drawing Sheets

SYSTEM FOR STARTING POWER SYSTEMS WITH MULTIPLE GENERATOR UNITS

TECHNICAL FIELD

The present disclosure relates to starting power systems, and, more particularly, to a control strategy and system for starting power systems having multiple generator units and for automatically using air and electric starters.

BACKGROUND

Power systems may have multiple generator units for supplying electricity to one or more electric power loads. For example, a multi-engine generator set switcher locomotive may include three power modules. Each power module includes an internal combustion engine associated with each generator unit. The engines may be started by various starting systems, such as an air start system and an electric start system. An electric start system may draw electric power from an electric source on the locomotive, such as a battery bank or from other engines already running, for example. An air start system may draw compressed air from an onboard compressed air source, such as a compressed air tank, for example. The compressed air source is used to provide compressed air for starting rotation of the crankshaft of the engine.

An air start system, however, may be ineffective for starting an engine if the amount of compressed air provided by the compressed air source is less than what is required to start the engine. Moreover, an electric start system may increase wear associated with the electric power source and with an associated starter motor.

An example of an air start system for using compressed air to start an engine is described in U.S. Pat. No. 4,324,212 (the '212 patent), issued on Apr. 13, 1982 in the name of Samuel et al. and assigned to Rederiaktiebolaget Nordstjernan of Sweden and Oy Wartsila A B of Finland. An example of an electric start system for use on an engine is described in U.S. Pat. No. 4,543,923 (the '923 patent), issued on Oct. 1, 1985 in the name of Hamano et al. and assigned to Mitsubishi Denki Kabushiki Kaisha. U.S. Pat. No. 4,235,216 (the '216 patent), issued on Nov. 25, 1980 in the name of Miles discloses an electric start system with a pneumatically actuated auxiliary start system.

Although the '212 patent and the '923 patent disclose an air start system and an electric start system, respectively, for starting an engine, the efficacy of the systems is limited. For example, nowhere does the '923 patent disclose using a compressed air source to start the engine and nowhere do the '212 patent and the '216 patent disclose an electric start system which starts the engine if the air start system fails. The '212, '923, and '216 patents show that air start and electric start systems are known. Modern locomotives and industrial gas turbine engines are known which have both electric and air start mechanisms. However, none of these automatically coordinate a choice between electric or air start.

The disclosed strategy and system is directed to overcoming one or more of the problems set forth above.

SUMMARY

In one aspect, the present disclosure is directed toward a power system including at least one power module; a compressed air source in communication with the power module; an electric power source in communication with the power module; and a control module in communication with the power module, the compressed air source, and the electric power source, the control module configured to command the compressed air source to provide compressed air to the power module when the compressed air source is in a first state and to command the electric power source to provide electric power to the power module when the compressed air source is in a second state.

In another aspect, the present disclosure is directed toward a method of starting an engine, the method including the steps of measuring a pressure of compressed air in a compressed air source; if the measured pressure of compressed air is in a first state, using the compressed air to turn a compressed air-powered starter motor to start the engine; and if the measured pressure of compressed air is in a second state, using electric power to turn an electric-powered starter motor to start the engine.

In yet another aspect, the present disclosure is directed toward a control system for starting a plurality of engines including a first engine and a second engine, the system including a compressed air source in communication with the plurality of engines; an electric power source in communication with the plurality of engines; and a control module in communication with the plurality of engines, the compressed air source, and the electric power source, the control module configured to command the compressed air source to provide compressed air to an air-powered starter motor to start the plurality of engines when the compressed air source is in a first state and to command the electric power source to provide electric power to an electric-powered starter motor to start the plurality of engines when the compressed air source is in a second state.

In a still further aspect, the present disclosure is directed toward a method for starting multiple power modules, the method including the steps of evaluating a compressed air source to determine whether the compressed air source is in a first state or a second state; communicating a first start signal to an air starter system for starting a first power module when the compressed air source is in the first state; communicating a second start signal to an electric starter system for starting the first power module when the compressed air source is in the second state; communicating a third start signal to the air starter system for starting a second power module when the compressed air source is in the first state; and communicating a fourth start signal to the electric starter system for starting the second power module when the compressed air source is in the second state.

DETAILED DESCRIPTION

Figure 1:
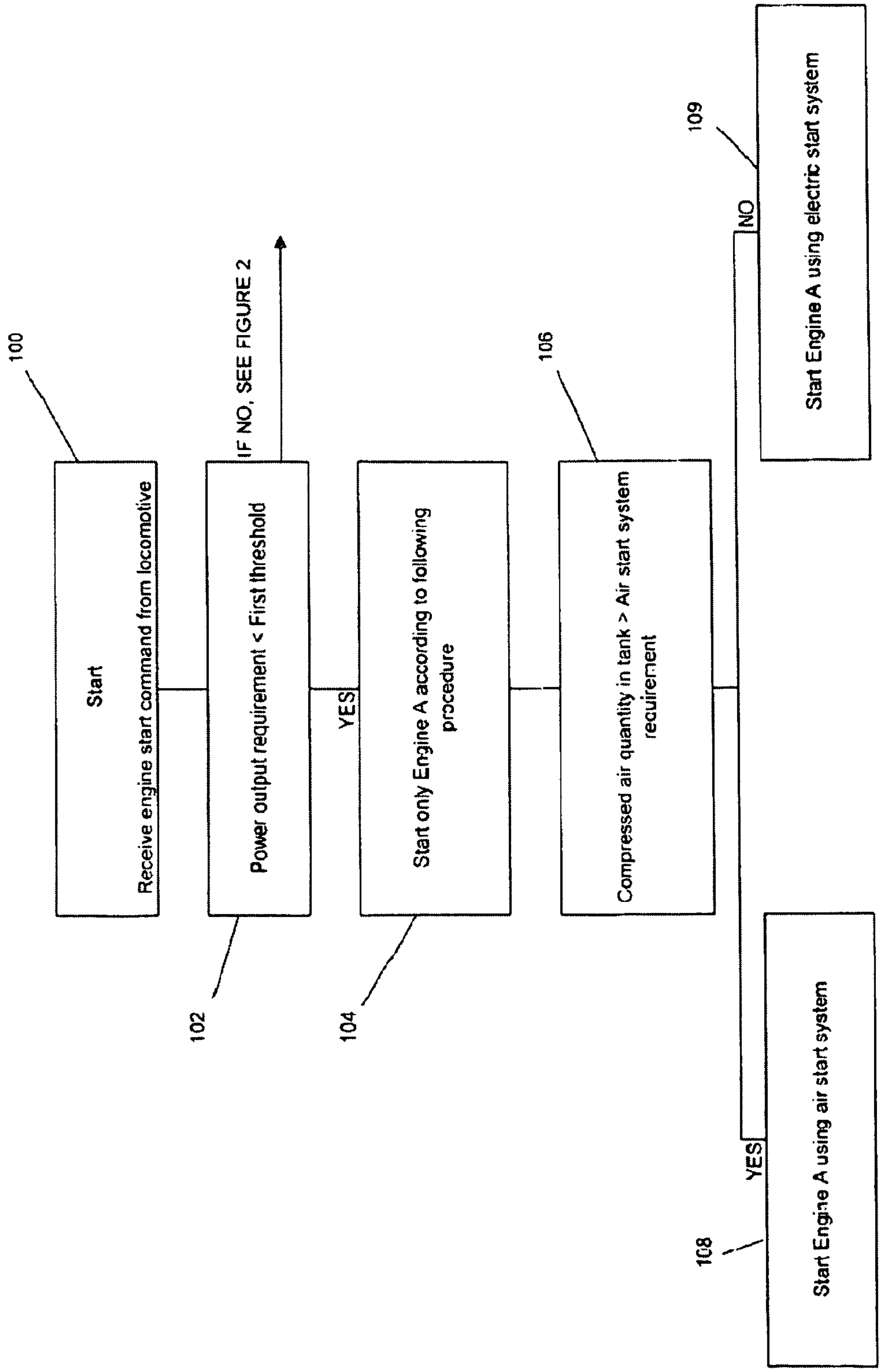
FIG. 1 is a block diagram illustrating a portion of a first exemplary control strategy according to the present disclosure.
Figure 2:
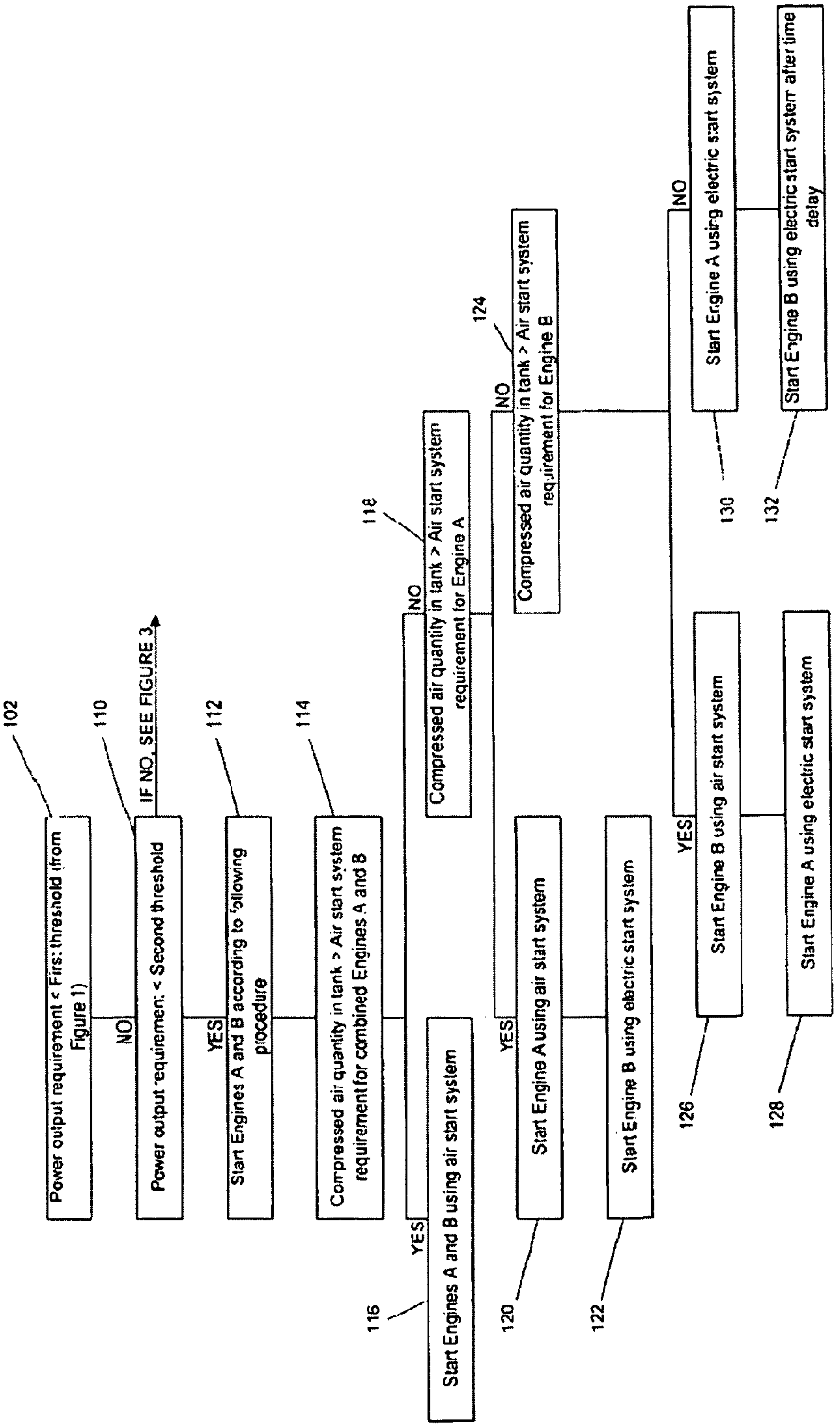
FIG. 2 is a block diagram illustrating another portion of the exemplary control strategy of FIG. 1.
Figure 3:
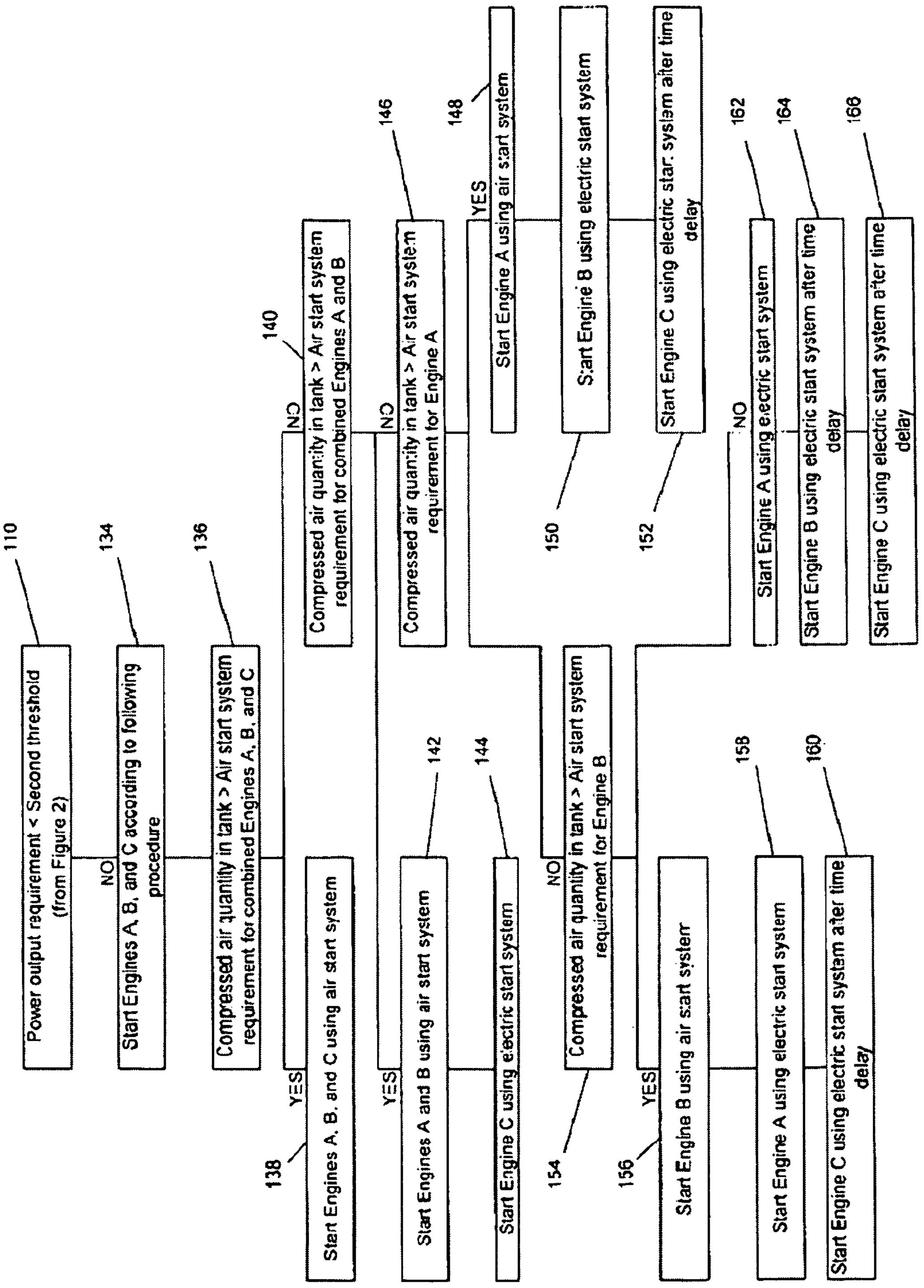
FIG. 3 is a block diagram illustrating yet another portion of the exemplary control strategy of FIGS. 1 and 2.

FIGS. 1-3 illustrate an exemplary control strategy which may be used to provide control for starting engines associated with power systems having a plurality of power modules. Specifically, FIGS. 1-3 illustrate a control strategy for use with a multi-engine generator set switcher locomotive having three power modules, each of which has an engine associated therewith. The control strategy illustrated in FIGS. 1-3 may be implemented into an engine control module associated with the locomotive, such as the engine control module depicted in FIG. 6 and described below. Each power module may include a generator unit having a power source which may be any type of component operable to produce mechanical power, including, but not limited to, a diesel engine, a turbine engine, a gasoline engine, or a gaseous-fuel-driven engine. Each power source may be started with either an air start system or an electric start system, examples of which are known to those of skill in the art. Because each power module has an engine associated therewith, the engines may be labeled Engine A, B, C, for example. The engine control module may designate which engine is labeled Engine A, B, C, and these designations may vary throughout the lifetime of the locomotive.

A locomotive may include multiple engines so that only the engines needed to match the power demand of the locomotive are running, as described in examples below. The remaining engines are switched off to conserve energy and reduce wear on the engines. This may factor into the designation of the engines as Engine A, B, C throughout the lifetime of the locomotive, e.g., as Engine A endures more use and wear than Engines B and C, the engine control module may change the designation of the engines such that Engine B becomes Engine A, Engine C becomes Engine B, and Engine A becomes Engine C. The switching on and off of only the engines needed to match the power demand generally indicates that the engines of the locomotive start and stop relatively frequently as compared to normal 100% operation of an engine associated with the locomotive.

The control strategy illustrated in FIGS. 1-3 is initialized when the locomotive indicates to the engine control module that at least one engine, i.e., one generator unit, needs to be started. In step 100, the engine start command is received from the locomotive. The engine control module determines in step 102 whether the power output requirement associated with the engine start command is below a predetermined power output threshold. For example, if the power output requested by the locomotive is below 300 kW, then the engine control module may determine that only one engine needs to be started to satisfactorily meet the demands of the locomotive. In step 104, if the power output requirement is below the predetermined power output threshold, then the procedure to start only Engine A is initialized. The engine control module determines in step 106 whether sufficient compressed air pressure exists in the on-board compressed air tank or other compressed air source by completing a pressure check of the compressed air tank. For example, Engine A may require at least 50 p.s.i. for a time period of thirty seconds to sufficiently crank the engine for starting. If the engine control module determines that there is sufficient air pressure to start Engine A, then Engine A is started in step 108 using an air start system, i.e., the compressed air source provides compressed air to turn an air-powered starter motor to crank Engine A, and the compressed air source is in a first state, i.e., the compressed air source has sufficient compressed air to start the engine. If the engine control module determines that there is not sufficient compressed air pressure, then Engine A is started in step 109 using an electric start system, i.e., an electric power source provides electric power to turn an electric-powered starter motor to crank Engine A, and the compressed air source is in a second state, i.e., the compressed air source does not have sufficient compressed air to start the engine. During step 108, if Engine A cannot be cranked sufficiently, i.e., if Engine A does not start within a preset time period, such as thirty seconds, then the engine control module commands a second air start only if sufficient compressed air pressure is available and only if, during the first air start attempt, the engine was cranking faster than a threshold r.p.m. If the second air start fails, then the engine control module defaults to starting Engine A using the electric start system as in step 109.

If the engine control module determines in step 102 that the power output requirement is above the first threshold power output, then the control strategy continues to step 110, shown in FIG. 2. In step 110, the engine control module determines whether the power output requirement associated with the engine start command is below a second predetermined power output threshold. For example, if the power output requested by the locomotive is below 600 kW but above 300 kW, then the engine control module may determine that two engines need to be started to satisfactorily meet the demands of the locomotive. In step 112, if the power output requirement falls below the second predetermined power output requirement and above the first predetermined power output requirement, then the procedure to start Engines A and B is initialized. The engine control module determines in step 114 whether sufficient compressed air pressure to start both Engines A and B exists in the on-board compressed air tank or other compressed air source by completing a pressure check of the compressed air tank. For example, Engines A and B may each require at least 50 p.s.i. for a time period of thirty seconds to crank the engine for starting. If the engine control module determines that there is sufficient air pressure to start both Engines A and B, then Engines A and B are started sequentially in step 116 using an air start system. In an alternative embodiment, Engines A and B are started simultaneously in step 116. There may be a delay between starting Engine A and starting Engine B if system limitations dictate a time delay such that sufficient compressed air pressure remains for starting the second engine. For example, after Engine A is started, another pressure check is completed by the engine control module to verify that Engine B may be started immediately after Engine A. This secondary check may be necessary because occasionally the estimate of air pressure needed to start Engine A is inaccurate or the starting of Engine A used more air pressure than estimated. Thus, the engine control module rechecks the air pressure to ensure that Engine B may be started using an air start. If there is not sufficient air pressure in the compressed air source, then the control module commands that starting of Engine B be delayed until the running of Engine A can refill the compressed air source such that there is a sufficient amount of compressed air pressure contained therein for starting Engine B. If, after a predetermined time period after starting Engine A, the compressed air source does not have enough compressed air pressure to start Engine B, then the engine control module commands an electric start for Engine B.

If the engine control module determines that there is not sufficient air pressure to start both Engines A and B using an air start system, then the engine control module determines in step 118 whether there is sufficient compressed air pressure to start only Engine A. If the engine control module determines that there is sufficient compressed air pressure to start only Engine A, then Engine A is started in step 120 using an air start system and Engine B is started in step 122 using an electric start system. In an exemplary embodiment, Engines A and B are sequentially started. In another exemplary embodiment, Engines A and B are simultaneously started.

If the engine control module determines that there is not sufficient compressed air pressure to start only Engine A using an air start system, then the engine control module next determines in step 124 whether sufficient compressed air pressure exists to start only Engine B using an air start system. This may occur in a situation in which Engine B is a different capacity engine than Engine A that requires less compressed air to start than compared to Engine A. If the engine control module determines that there is sufficient compressed air pressure to start only Engine B, then Engine B is started in step 126 using an air start system and Engine A is started in step 128 using an electric start system. In an exemplary embodiment, Engines B and A are sequentially started. In another exemplary embodiment, Engines B and A are simultaneously started.

If the engine control module determines that there is not sufficient air pressure to start only Engine B using an air start system, then Engine A is started in step 130 using an electric start system and Engine B is started in step 132 using an electric start system after a sufficient time delay after Engine A is started. The time delay is provided to prevent overload of the electric current capacity of the electric power source.

If the engine control module determines in step 110 that the power output requirement is above the second threshold power output, then the control strategy continues to step 134, shown in FIG. 3. In step 134, the procedure to start Engines A, B, and C is initialized. The engine control module determines in step 136 whether sufficient air pressure to start Engines A, B, and C exists in the on-board compressed air tank or other compressed air source by completing a pressure check of the compressed air tank. If the engine control module determines that there is sufficient air pressure to start all Engines A, B, and C, then Engines A, B, and C are started sequentially in step 138 using an air start system. In an alternative embodiment, Engines A, B, and C are started simultaneously in step 138. There may be a delay between starting Engines A, B, and C if system limitations dictate a time delay such that sufficient air pressure remains for starting the second and third engines. For example, after Engine A is started, another pressure check is completed by the engine control module to verify that Engines B and C may be started using the air start system. This secondary check may be necessary because occasionally the estimate of air pressure needed to start Engine A is inaccurate or the starting of Engine A used more air pressure than estimated. Thus, the engine control module rechecks the air pressure to ensure that Engines B and C may be started. If there is not sufficient air pressure in the compressed air source, then the control module commands that starting of Engines B and C be delayed until the running of Engine A can refill the compressed air source such that there is a sufficient amount of air pressure contained therein for starting Engines B and C. If, after a predetermined time period after starting Engine A, the compressed air source does not have enough air pressure to start Engines B and C, then the engine control module commands an electric start for Engines B and C. A similar procedure is completed after Engine B is started using the air start system, i.e., the engine control module verifies that enough compressed air pressure exists in the compressed air source to start Engine C, and, if not, a time delay is provided and/or Engine C is started using the electric start system.

If the engine control module determines that there is not sufficient air pressure to start all of Engines A, B, and C using an air start system, then the engine control module determines in step 140 whether sufficient air pressure to start only Engines A and B exists in the on-board compressed air tank or other compressed air source by completing a pressure check of the compressed air tank. If the engine control module determines that there is sufficient air pressure to start only Engines A and B, then Engines A and B are started in step 142 using an air start system and Engine C is started in step 144 using an electric start system. There may be a delay between starting Engine A and starting Engine B if system limitations dictate a time delay such that sufficient air pressure remains for starting the second engine, as described above.

If the engine control module determines that there is not sufficient air pressure to start only Engines A and B using an air start system, then the engine control module next determines in step 146 whether there is sufficient compressed air pressure to start only Engine A. If the engine control module determines that there is sufficient compressed air pressure to start only Engine A, then Engine A is started in step 148 using an air start system, Engine B is started in step 150 using an electric start system, and Engine C is started in step 152 using an electric start system. There may be a delay between starting Engine B and Engine C if system limitations dictate a time delay such that sufficient electric power is available for starting the second engine and to prevent overloading the electric power source.

If the engine control module determines that there is not sufficient air pressure to start only Engine A using an air start system, then the engine control module determines in step 154 whether sufficient air pressure exists to start only Engine B using an air start system. If the engine control module determines that there is sufficient compressed air pressure to start only Engine B, then Engine B is started in step 156 using an air start system, Engine A is started in step 118 using an electric start system, and Engine C is started in step 160 using an electric start system. There may be a delay between starting Engine A and Engine C if system limitations dictate a time delay such that sufficient electric power is available for starting the second engine and to prevent overloading the electric power source.

If the engine control module determines that there is not sufficient compressed air pressure to start only Engine B using an air start system, then Engine A is started in step 162 using an electric start system, Engine B is started in step 164 using an electric start system after a sufficient time delay after Engine A is started, and Engine C is started in step 166 using an electric start system after a sufficient time delay after Engine B is started.

When either Engine A, B, or C is attempted to be started using an air start system either once or twice and cannot be cranked sufficiently, i.e., if the engine does not start within a preset time frame such as thirty seconds, then the engine control module defaults to starting the engine using the electric start system.

Figure 4:
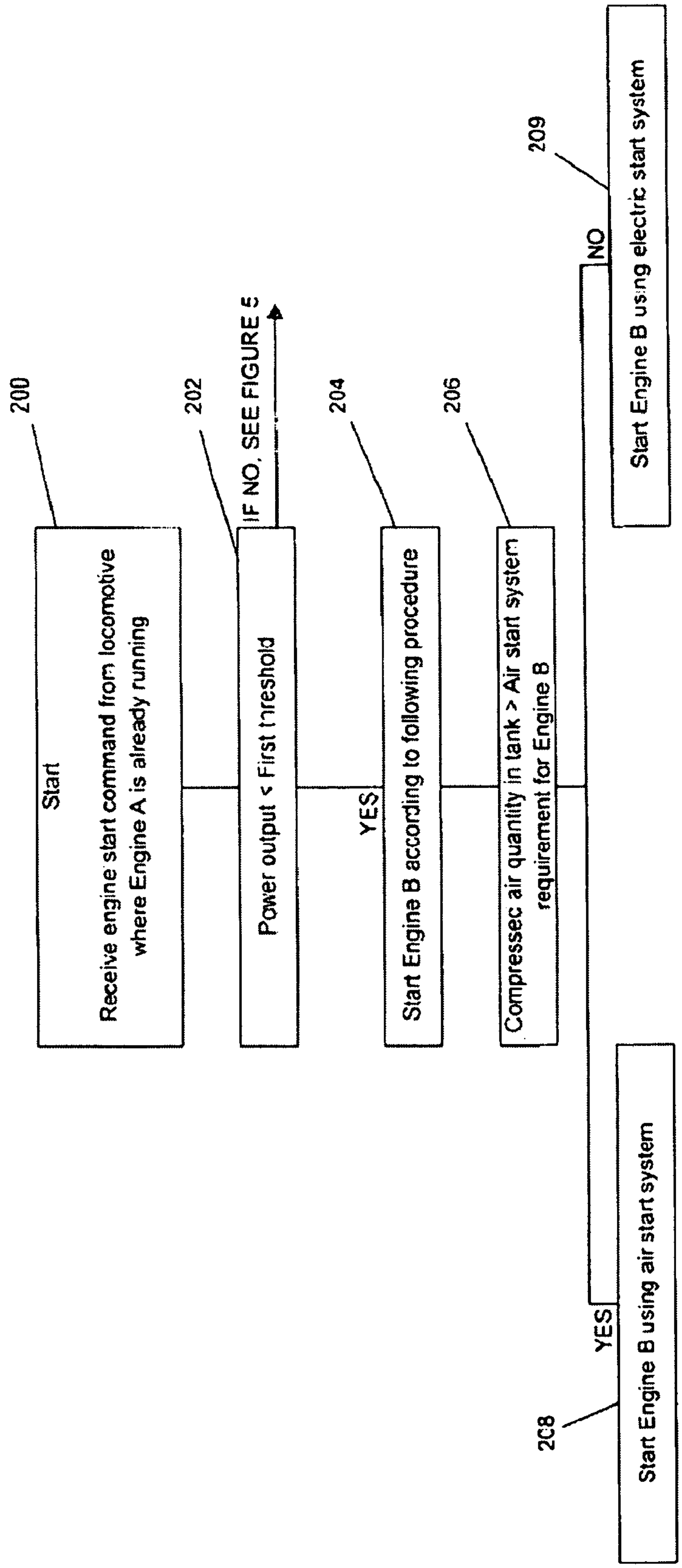
FIG. 4 is a block diagram illustrating a portion of a second exemplary control strategy according to the present disclosure.
Figure 5:
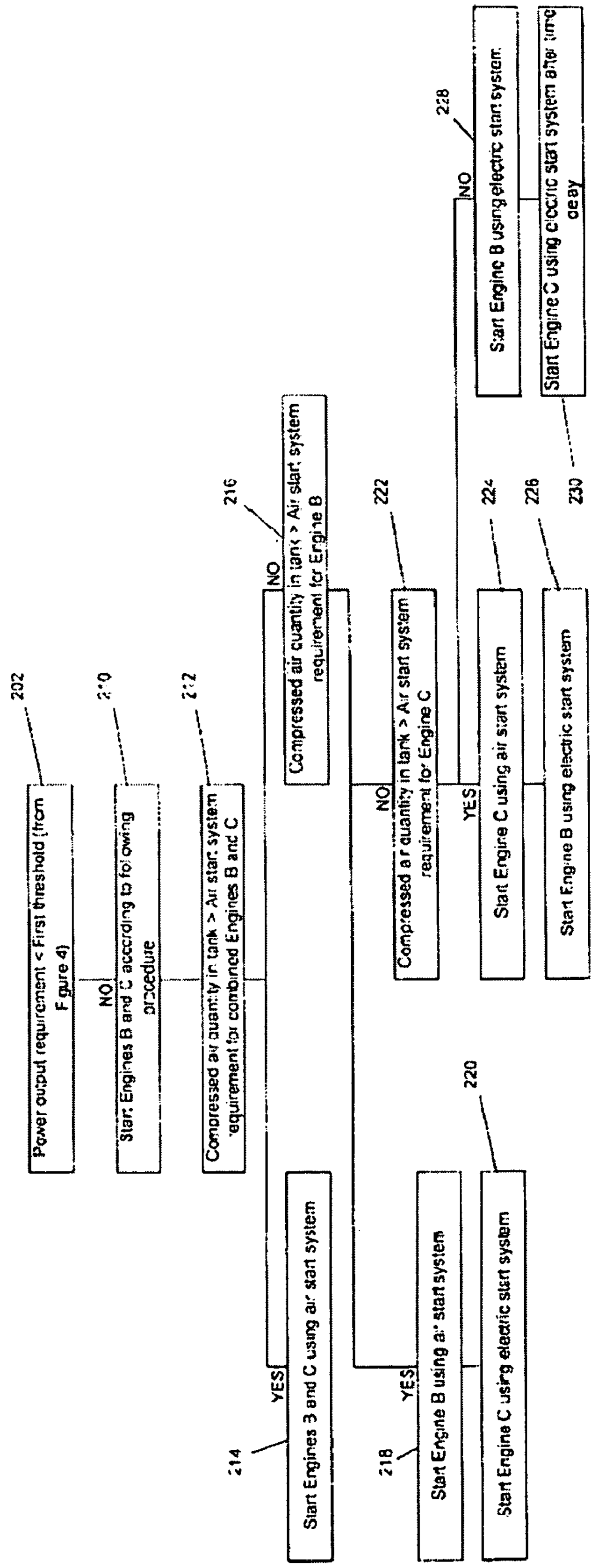
FIG. 5 is a block diagram illustrating another portion of the exemplary control strategy of FIG. 4.

The control strategy illustrated in FIGS. 4 and 5 is initialized when the locomotive indicates to the engine control module that at least one more engine, i.e., generator unit, needs to be started in addition to an engine that is already started. In step 200, the engine start command is received from the locomotive which already has Engine A started. The engine control module determines in step 202 whether the power output requirement associated with the engine start command is below a predetermined power output threshold. For example, if the additional power output requested by the locomotive is below 300 kW, then the engine control module may determine that only one more engine needs to be started to satisfactorily meet the demands of the locomotive. In step 204, the procedure to start only Engine B is initialized. The engine control module determines in step 206 whether sufficient compressed air pressure exists in the on-board compressed air tank or other compressed air source by completing a pressure check of the compressed air tank. If the engine control module determines that there is sufficient air pressure to start only Engine B, then Engine B is started in step 208 using an air start system. If the engine control module determines that there is not sufficient air pressure to start Engine B, then Engine B is started in step 209 using an electric start system. During step 208, if Engine B cannot be cranked sufficiently, i.e., if Engine B does not start within a preset time frame such as thirty seconds, then the engine control module may default to starting Engine B using the electric start system as in step 209.

If the engine control module determines in step 202 that the power output requirement is above the first threshold power output, then the control strategy continues to step 210, shown in FIG. 5. In step 210, the procedure to start Engines B and C is initialized. The engine control module determines in step 212 whether sufficient compressed air pressure to start both Engines B and C exists in the on-board compressed air tank or other compressed air source by completing a pressure check of the compressed air tank. If the engine control module determines that there is sufficient air pressure to start both Engines B and C, then Engines B and C are started in step 214 using an air start system. There may be a delay between starting Engine B and starting Engine C if system limitations dictate a time delay such that sufficient air pressure remains for starting the second engine. For example, after Engine B is started, another pressure check is completed by the engine control module to verify that Engine C may be started immediately after Engine B. If there is not sufficient air pressure in the compressed air source, then the control module commands that starting of Engine C be delayed until the running of Engine B can refill the compressed air source such that there is a sufficient amount of air pressure contained therein for starting Engine C. If, after a predetermined time period, Engine B and Engine A (which was already running prior to starting Engine B) have not produced enough air pressure to refill the compressed air source, then the engine control module commands an electric start for Engine C.

If the engine control module determines that there is not sufficient air pressure to start both Engines B and C using an air start system, then the engine control module determines in step 216 whether there is sufficient air pressure to start only Engine B. If the engine control module determines that there is sufficient air pressure to start only Engine B, then Engine B is started in step 218 using an air start system and Engine C is started in step 220 using an electric start system.

If the engine control module determines that there is not sufficient air pressure to start only Engine B using an air start system, then the engine control module determines in step 222 whether sufficient air pressure exists to start only Engine C using an air start system. If the engine control module determines that there is sufficient air pressure to start only Engine C, then Engine C is started in step 224 using an air start system and Engine B is started in step 226 using an electric start system. If Engine C cannot be cranked sufficiently, i.e., if Engine C does not start within a preset time frame such as thirty seconds and/or suffers two failed cranking attempts, then the engine control module defaults to starting Engine C using an electric start system.

If the engine control module determines that there is not sufficient air pressure to start only Engine C using an air start system, then Engine B is started in step 228 using an electric start system and Engine C is started in step 230 using an electric start system after a sufficient time delay after Engine B is started, as described above.

INDUSTRIAL APPLICABILITY

The disclosed control system and strategy for starting power systems may be applicable to provide control for starting a power system having a plurality of power modules. For example, a multi-engine generator set switcher locomotive has three power modules each of which have an engine associated therewith as a power source. Upon receiving a command from the locomotive indicating to the engine control module to start at least one engine, the control strategy determines whether to start the engine with an air or electric start. The control strategy starts only a single engine at a time, thereby avoiding overloading the airflow capacity of the compressed air source or the electric power capacity of the electric source. The control strategy also implements a command to start every engine with an air starter, if possible, to preserve the electric starter motor and the electric power capacity of the electric source.

Figure 6:
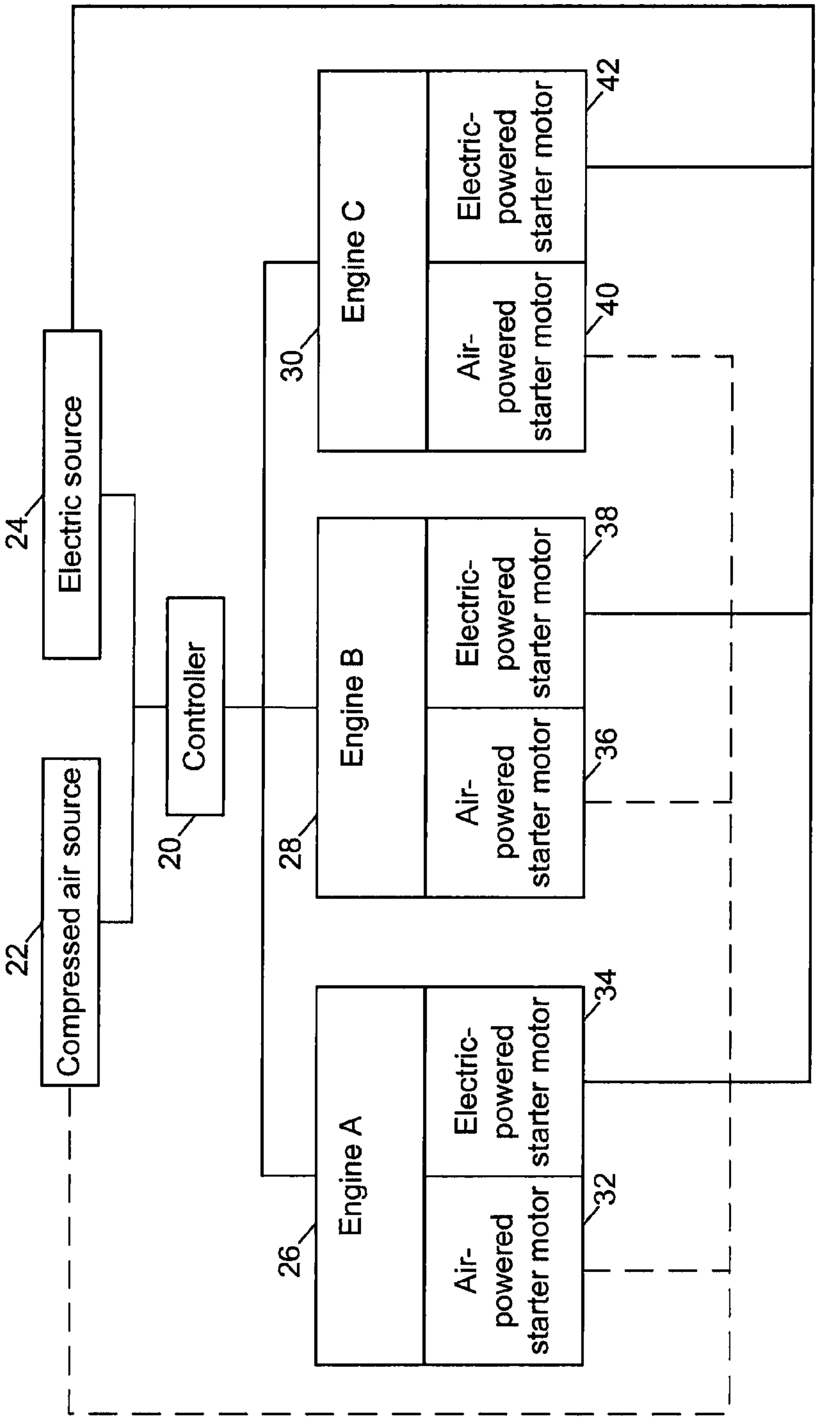
FIG. 6 is a block diagram illustrating a control module according to the present disclosure.

As shown in FIG. 6, an exemplary power system of the present disclosure includes engine control module or controller 20 in communication with compressed air source 22 and electric source 24 such that sources 22, 24 provide signals to controller 20 indicative of available compressed air pressure and electric power, respectively. Controller 20 is also in communication with power source 26, i.e., Engine A, power source 28, i.e., Engine B, and power source 30, i.e., Engine C, such that controller 20 provides start signals to power sources 26, 28, 30 according to the engine control strategy described above. Power sources 26, 28, 30 are each equipped with air-powered starter motors 32, 36, 40, respectively, and electric-powered starter motors 34, 38, 42, respectively. Compressed air source 22 and electric source 24 are each connected to power sources 26, 28, 30 to provide starter power to power sources 26, 28, 30 according to the commands provided by controller 20.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

I claim:

1. A control system for starting a plurality of engines including a first engine and a second engine, the system comprising:

a compressed air source in communication with the plurality of engines;

an electric power source in communication with the plurality of engines; and a control module in communication with the plurality of engines, the compressed air source, and the electric power source, the control module configured to automatically command the compressed air source to provide compressed air to an air-powered starter motor to start the plurality of engines when the compressed air source is in a first state and to automatically command the electric power source to provide electric power to an electric-powered starter motor to start the plurality of engines when the compressed air source is in a second state.

2. The control system of claim 1, wherein the control module is configured to coordinate starting the plurality of engines based on at least one measurement of compressed air provided by the compressed air source.

3. The control system of claim 1, wherein the first state corresponds to the compressed air source having a quantity of compressed air greater than a threshold quantity of compressed air, wherein the threshold quantity of compressed air corresponds to a quantity of compressed air necessary for starting at least one of the plurality of engines.

4. The control system of claim 3, wherein the second state corresponds to the compressed air source having a quantity of compressed air less than the threshold quantity of compressed air.

5. The control system of claim 1, wherein the control module is configured to command the compressed air source to provide compressed air to an air-powered starter motor of the first engine of the plurality of engines when the compressed air source is in the first state.

6. The control system of claim 5, wherein the control module is configured to command the compressed air source to provide compressed air to an air-powered starter motor of the second engine of the plurality of engines when the compressed air source is in the first state.

7. The control system of claim 5, wherein the control module is configured to command the compressed air source to provide compressed air to an air-powered starter motor of a third engine of the plurality of engines when the compressed air source is in the first state.

8. The control system of claim 5, wherein the control module is configured to command the electric power source to provide electric power to an electric-powered starter motor of the second engine of the plurality of engines when the compressed air source is in the second state.

9. The control system of claim 5, wherein the control module is configured to command the electric power source to provide electric power to an electric-powered starter motor of a third engine of the plurality of engines when the compressed air source is in the second state.

10. The control system of claim 1, wherein the control module is configured to command the electric power source to provide electric power to an electric-powered starter motor of the first engine of the plurality of engines when the compressed air source is in the second state.

11. A method for starting multiple power modules, the method comprising the steps of:

automatically evaluating a compressed air source to determine whether the compressed air source is in a first state or a second state, wherein the first state corresponds to the compressed air source having a quantity of compressed air greater than a threshold quantity of compressed air and the second state corresponds to the compressed air source having a quantity of compressed air less than the threshold quantity of compressed air, wherein the threshold quantity of compressed air corresponds to a quantity of compressed air necessary for starting at least one of the first power module and the second power module;

communicating a first start signal to an air starter system for starting a first power module when the compressed air source is in the first state;

communicating a second start signal to an electric starter system for starting the first power module when the compressed air source is in the second state;

communicating a third start signal to the air starter system for starting a second power module when the compressed air source is in the first state; and communicating a fourth start signal to the electric starter system for starting the second power module when the compressed air source is in the second state.

12. The method of claim 11, further including the step of reevaluating the compressed air source to determine whether the compressed air source is in the first state or the second state after starting the first power module and before starting the second power module.

13. The method of claim 11, further including the steps of communicating a fifth start signal to the air starter system for starting a third power module when the compressed air source is in the first state, and communicating a sixth start signal to the electric starter system for starting the third power module when the compressed air source is in the second state.

14. The method of claim 13, further including the step of reevaluating the compressed air source to determine whether the compressed air source is in the first state or the second state after starting the second power module and before starting the third power module.

* * * * *

UNITED STATES PATENT AND TRADEMARK OFFICE

CERTIFICATE OF CORRECTION

PATENT NO. : 8,319,356 B2
APPLICATION NO. : 12/198231
DATED : November 27, 2012
INVENTOR(S) : Roy C. Fonseca It is certified that error appears in the above-identified patent and that said Letters Patent is hereby corrected as shown below:

On the Title Page, Column 1, Item 75 (Inventor), line 1, delete “Roy C Fonseca,” and insert -- Roy C. Fonseca, --.

In the Specification

Column 1, line 38, delete “Oy Wartsila A B” and insert -- Oy Wartsila AB --.

Column 6, line 30, delete “step 118” and insert -- step 158 --.

Signed and Sealed this
Eighteenth Day of August, 2015

Michelle K. Lee
*Director of the United States Patent and Trademark Office*